No. 623,299. Patented Apr. 18, 1899.
L. W. WILSON.
HAY RAKE.
(Application filed Aug. 7, 1896.)
(No Model.) 2 Sheets—Sheet 1.
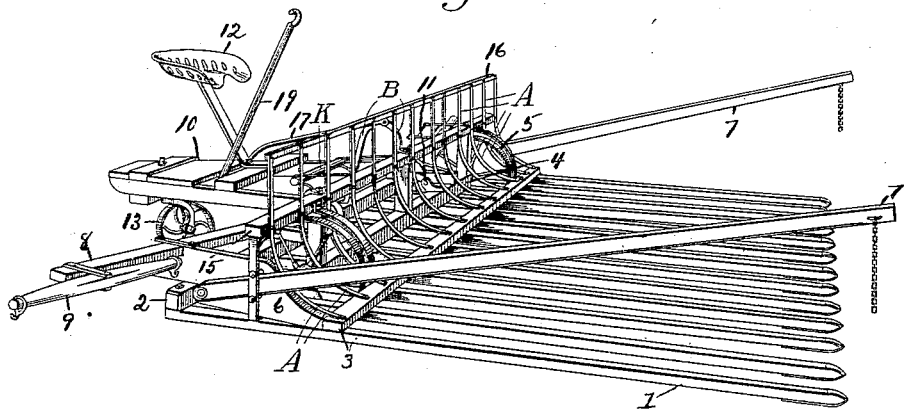
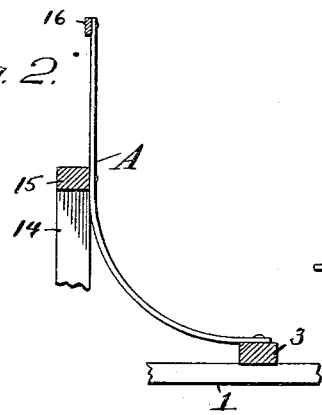
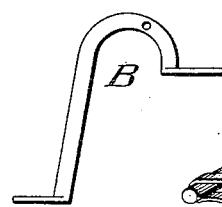
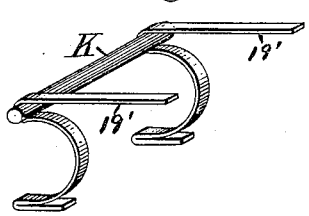
Witnesses.
A. M. Smith
H. M. White
Inventor.
Leonidas W. Wilson
By Glascock & Co.
Attys No. 623,299. Patented Apr. 18, 1899.
L. W. WILSON.
HAY RAKE.
(Application filed Aug. 7, 1896.)
(No Model.) 2 Sheets—Sheet 2.
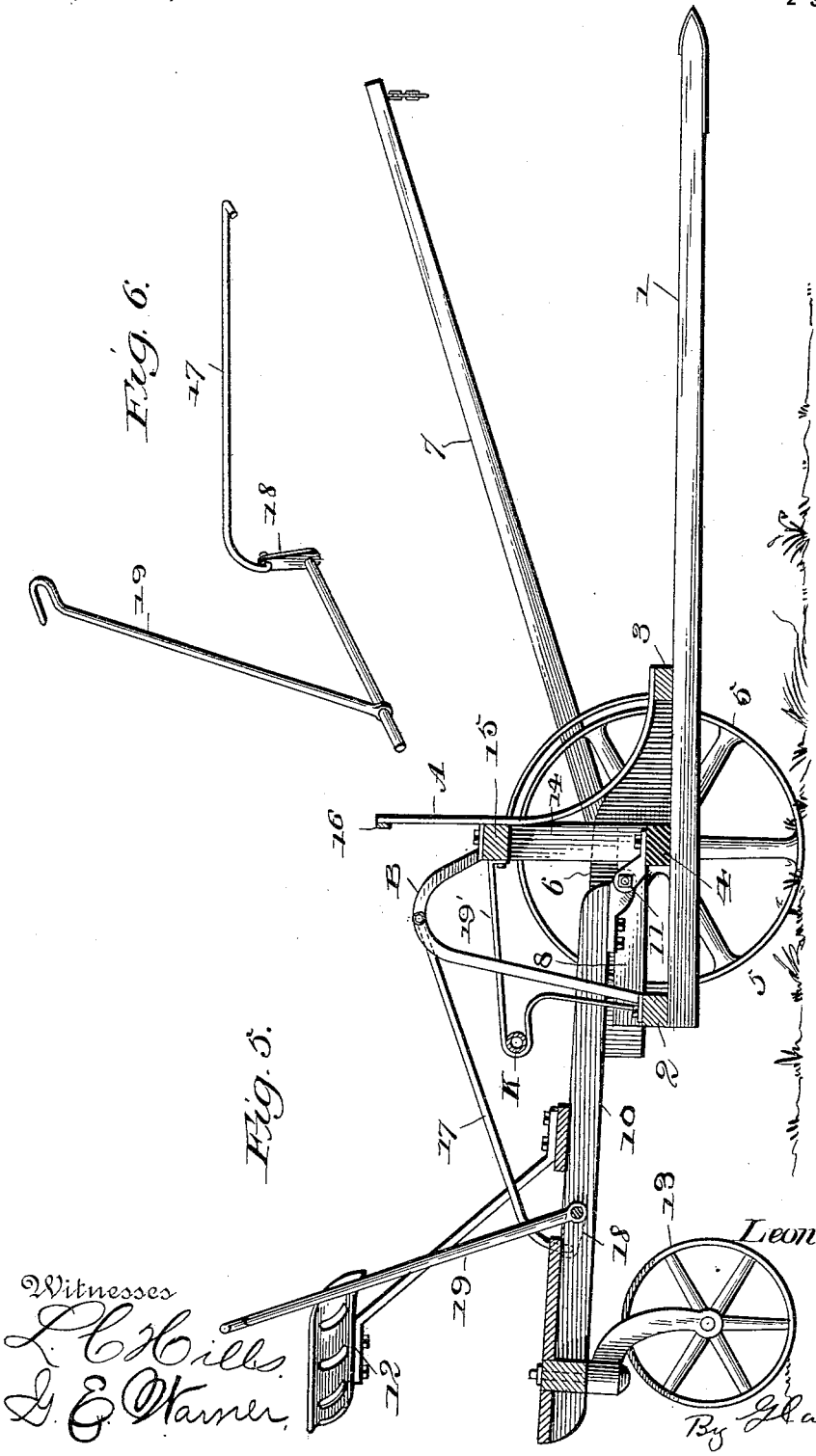
Witnesses
L. C. Hill.
L. E. Warner.
Leonidas W. Wilson,
Inventor:
By Glascock &co
Attorneys.

UNITED STATES PATENT OFFICE.

LEONIDAS WILLIAM WILSON, OF CLIMAX, OHIO.

HAY-RAKE.

SPECIFICATION forming part of Letters Patent No. 623,299, dated April 18, 1899.

Application filed August 7, 1896. Serial No. 602,102. (No model.)

*To all whom it may concern:*

Be it known that I, LEONIDAS WILLIAM WILSON, a citizen of the United States, residing at Climax, in the county of Morrow, State of Ohio, have invented certain new and useful Improvements in Hay-Rakes, of which I declare the following to be a full, clear, and exact description, reference being had to the accompanying drawings, forming part of this specification.

This invention has relation to that class of rakes commonly known as "sweep-rakes," wherein the gathering of hay is effected by means of long teeth that project to the front, said teeth being mounted on suitable traveling wheels, and more particularly does it relate to that style of such rakes wherein the rake-head is provided with a rearwardly-extending frame hinged thereto and carrying a driver's seat and mechanism whereby the rake-teeth can be permitted to ride freely over the surface of the ground in contact therewith or can be lifted completely away therefrom.

The object of my invention is to provide mechanism whereby the operator can readily control the lowering or elevation of the rake-teeth during the operation of raking or when passing from one field to another. The rake-teeth are provided at their rear ends with a number of upwardly-extending springs, which are adapted to form a support for the load of hay as it is gathered by the teeth. The load is collected back toward the rear ends of the teeth and in the vicinity of the axle of the rake, thus, in a measure, centrally locating the load. The driver's platform is provided with a lever which is connected to the framework supporting the teeth, and said framework is provided with a foot-rest. Thus when it is desired by the driver to elevate the teeth while carrying a load he pulls the lever to the rear and at the same time bears with his weight upon the foot-rest, and, the load being approximately centrally located upon the teeth, the operation of lifting the teeth is much easier than is ordinarily accomplished with the usual construction.

In the accompanying drawings, Figure 1 is a perspective view of the rake. Fig. 2 is a sectional view of the rear portion of the framework supporting the teeth and showing the spring-bars. Fig. 3 is a side elevation of an iron used on the framework supporting the teeth. Fig. 4 is a perspective view of the foot-rest. Fig. 5 is a longitudinal sectional view of the rake. Fig. 6 is a perspective view of a lever used for elevating and lowering the teeth.

The teeth 1 are connected at their rear ends by means of the cross-bar 2. The cross-bar 3 also connects the upper sides of the teeth at an intermediate point. Between the cross-bars 2 and 3 the axle 4 is located, the wheels 5 5 being journaled to said axle. The axle is also secured to the upper faces of the teeth 1 1. The side pieces 6 6 are secured at or near the outer ends of the cross-bars 2 and 3, and the inner ends of the tongues 7 are secured to the said side pieces 6. The arms 8 are secured at their ends to intermediate points on the cross-bar 2, and at intermediate points of the said arms 8 they are attached to the side pieces 6. The said arms 8 extend laterally from each side of the rake, each arm 8 supporting a singletree 9. The platform 10 is hinged at its forward edge at the points 11 to the axle 4. Said platform carries the driver's seat 12 and is supported at its rear end by the caster-wheel 13. The uprights 14 are erected from the axle 4, and the upper ends of the said uprights support the cross-bar 15. The spring-rods A are secured at their lower ends to the cross-bar 3 and at intermediate points to the cross-bar 15, the upper ends of the said spring-rods being connected together by the horizontal rod 16. The inverted-U-shaped iron B is secured at one end to the cross-bar 15 and at its other end to the cross-bar 2. The rod 17 is pivotally attached at one end to the upper portion of said iron B, the other end of the said iron being curved down and secured to the crank extension 18 of the lever 19, said lever in turn being fulcrumed in the frame 10 of the platform. Irons 19' are secured at their upper ends to the cross-bar 15 and extend to the rear, where they are then bent under, forming loops to receive the bar K, as shown in detail in Fig. 4. The irons are then curved inwardly and secured at their lower ends to the cross-bar 2.

In operation the rake works as follows: The horses are attached to the singletrees 9 9, and the ends of the tongues are connected to the collars of the animals in the ordinary manner. The driver assumes his seat, and the teeth 1 in their lowered position are passed over the ground. The hay is thus raked up and loaded upon the upper surface of the teeth 1 and against the spring-rods A. When sufficient load is gathered, the driver presses his feet upon the foot-bar K. At the same time he pulls the upper end of the lever 19 to the rear, causing the forward ends of the teeth 1 to elevate, and thus the load may be carried to any convenient point. When it is desired to deposit the load, the teeth are lowered and the team is backed, the teeth being thereby slipped from beneath the load of hay, and thus it is deposited upon the ground.

Having thus described my invention, what I claim as new, and desire to secure by Letters Patent, is—

1. A hay-rake consisting of a number of forwardly-extending teeth, cross-bars securing said teeth together, an axle mounted on wheels, said axle being secured to the teeth, a cross-bar located above the axle and connected to the same, a foot-rest supported by said cross-bar, a platform pivotally connected at its forward edge to the axle, a wheel supporting the rear end of said platform, a lever fulcrumed on the platform, and a rod connected to said lever and to the cross-bar located above the axle.

2. A rake consisting of a number of teeth, an axle carrying wheels and being secured at intermediate points to the said teeth, a cross-bar secured to the rear ends of the teeth, a cross-bar located above the axle and supported thereby, an inverted-U-shaped iron secured at one end to the cross-bar above the axle and at the other end to the cross-bar at the rear ends of the teeth, a foot-rest consisting of a horizontal bar, irons secured at their upper forward ends to the cross-bar above the axle and extending to the rear and passing under the horizontal bar, said irons being secured at their outer ends to the cross-bar at the rear ends of the teeth, a platform supported at its rear end by a wheel and connected at its forward end to the axle, a lever fulcrumed on said platform, and a rod connecting the said lever with the said inverted-U-shaped iron.

3. A rake consisting of a number of teeth, an axle carrying suitable wheels and supporting said teeth, a cross-bar located above said axle and supported thereby, a cross-bar located in front of the axle and connecting the upper faces of the teeth together, spring-rods secured at their lower forward ends to the cross-bar in front of the axle and at intermediate points to the cross-bar above the axle, and a cross-rod connecting the upper ends of said spring-rods.

4. In a device of the character described, a hay-rake comprising a number of forwardly-extending teeth secured together and mounted on wheels, a cross-bar above the teeth and rigidly secured therewith, a lever adapted to operate the cross-bar and a foot-rest extending from said cross-bar, substantially as described.

LEONIDAS WILLIAM WILSON.

Witnesses:
W. E. MILLER,
R. F. BARTLETT.